United States Patent Office 3,119,781
Patented Jan. 28, 1964

3,119,781
FORMALDEHYDE REACTION PRODUCT REACTED WITH AN ALKYLENE OXIDE, AND MIXTURE THEREOF WITH A POLYGLYCIDYL POLYETHER
Mortimer T. Harvey, South Orange, and Peter L. Rosamilia, Newark, N.J., assignors, by mesne assignments, to Minnesota Mining and Manufacturing Company, St. Paul, Minn., a corporation of Delaware
No Drawing. Filed Sept. 8, 1960, Ser. No. 54,588
20 Claims. (Cl. 260—42)

The present invention relates to novel reaction products as well as to methods for preparing them. In one of its more specific aspects the invention is directed to novel products of chemical reaction of (I) an alkylene oxide such, for example, as ethylene oxide, propylene oxide, butylene oxide, with (II) organic reaction products of (a) formaldehyde and (b) tertiary alkyl alcohols, examples of which are tertiary amyl alcohol, tertiary butyl alcohol, tertiary hexyl alcohol, etc., terpenes and terpene alcohols and mixtures thereof, examples of which are pine oil, gum turpentine or any one or a combination of two or more of the individual terpenes and terpene alcohol components of said pine oil and turpentine. Such materials (II) preferably employed in the practice of this invention are those which are liquid at 130° C.

The products of the present invention can be further reacted with sulfuric acid or with phosphoric acid or their equivalents to produce sulfonation or phosphonation products which have general use and also the particular use of breaking emulsions such as those emulsions of water and mineral oils obtained when mineral oil is pumped from a well into storage tanks. Also, some of the products of the present invention can be used as additives to mineral oils including gasoline for detergent and anti-oxidant properties for the purpose of reducing sludging and thickening generally. The products of the present invention may be combined with epoxy resins and such combinations may be cured to the substantially solid and infusible state by employing amines, polycarboxylic acids, as well as their anhydrides which act as coreactants with the epoxy resins during the curing step. Other curing agents such as boron triflouride, complexes thereof and other strongly acidic agents may also be used as curing agents for such combinations.

By the term "epoxy resin" as employed herein is meant the polyepoxide compounds which contain reactive vicinal epoxy linkages available as reaction sites. Examples of some of such epoxy resins are the glycidyl polyethers of polyhydric phenols and/or polyhydric aliphatic alcohols produced by following the method described in U.S. Patent 2,839,481. Another class of such epoxy resins are those prepared by the direct epoxidation of aliphatic or aromatic unsaturated compounds. These resins and compositions containing these resins are classified the U.S. Patent Office as Class 260, Sub-Class 2, 42, 47 and 348 and reference may be had thereto for the patents as well as certain publications in the field of epoxy resins. The epoxy resins which are preferably employed in the present combinations are those having a 1,2 epoxide equivalency greater than 1, and more preferably such resins which are polyglycidyl polyethers of polyhydric phenols and/or polyhydric aliphatic alcohols, examples of some of them and their methods of preparation being disclosed in the U.S. patent to D. Wasserman No. 2,891,026 of June 16, 1959, which is hereby made a part hereof.

The products of the present invention can be obtained in various degrees of solubility of the selection of the compounds which are reacted with formaldehyde and by controlling the several steps of the chemical reactions involved. As pointed out and disclosed hereinafter, various products can be obtained which are soluble in various degrees including degrees of near solubility in various solvents including water, alcohol, ketones, aromatic spirits and gasolines and other petroleum oils. Those with the near solubilities or on the edge of solubility in either oils or water are useful in breaking emulsions and for detergent and anti-oxidant purposes and those which are nearly soluble in water are useful as detergents for cleaning and washing fabrics and for cleaning the surfaces of metals, wood, plastics and so on and for increasing the wetting characteristics of certain liquid solvents and cleaning agents to facilitate the cleaning operation and to cut down the time required for cleaning.

Prior to this invention, it was known to those skilled in the art that pine oil, gum turpentine, terpene alcohols such as the various terpineols, fenchyl alcohol, etc., terpenes such as beta pinene, for example, as well as the tertiary alkyl alcohols such as tertiary amyl alcohol, tertiary butyl alcohol, tertiary hexyl alcohol etc., were reacted with formaldehyde to provide organic reaction products liquid at temperature of 130° C. By "formaldehyde" we mean formaldehyde or its equivalents such as trioxane, paraformaldehyde, etc., as well as formaldehyde donors.

In general, such reaction products (II) are produced by heat reacting one mole of (b) with one or more, and generally 1–9, moles of (a) depending upon the material (b) employed and the reaction product (II) desired. Such reaction is preferably carried out by boiling the mixture under reflux condenser while the mixture is under controlled acidic conditions, wherein the pH is in the range of approximately 1–4, which may vary depending upon the acidic agent or catalyst used, the quantity thereof, the desired rate of reaction and the reaction product (II) desired.

The various materials (II) employed in the practice of this invention may be produced by following the teachings of the U.S. patents to M. T. Harvey, 2,323,129 of June 29, 1943; 2,327,422 of August 24, 1943; 2,350,230 of May 30, 1944; 2,333,927, 2,333,928 and 2,333,929 all three of November 9, 1948. Besides all of the various examples of material (II) and the methods for producing them as disclosed therein, the following Examples A–F are additional examples of specific methods for producing still other specific materials (II), all of which may be used in the practice of this invention, all parts being given by weight unless otherwise specified.

EXAMPLE A

One mole of beta-pinene was mixed with 2 moles of formaldehyde, in the form of a 27% aqueous solution, in the presence of a small amount of hydrochloric acid. The mixture was refluxed at 96° C. for 6½ hours at which time a phase inversion had taken place due to the reaction product becoming heavier than the aqueous phase. Most of the water was then decanted and the condensation or reaction product was stripped of residual water and volatiles at a reduced pressure to leave a mass consisting essentially of beta pinene-formaldehyde organic reaction product having a viscosity of 5000 cp. at 25° C. being liquid at 20° C. and also at 150° C. and is hereinafter known as material II-A.

EXAMPLE B

About 42½ parts of commercial water solution of formaldehyde (about 37%) and about 2.7 parts of concentrated sulphuric acid (density about 1.84) were mixed together and run into a reaction vessel having a stirrer and a jacket provided with connections to heating and cooling media. About 68 parts of beta pinene were added, the stirrer set in motion and steam applied to the jacket of the vessel. When the temperature reached 195° F. the steam was turned off and cooling water was turned into the jacket. An exothermic reaction took place and the temperature was held at about 215° F. until the reaction subsided and the temperature fell to 195° F. at which point the cooling water was turned off and steam reapplied to hold the temperature at 195° F. at which point it was held for 9 hours, the stirring being continued. After this, the steam was shut off and four tenths of a part of sodium hydroxide were added to the mass for neutralization and the stirring continued for 30 minutes. The stirrer was stopped and the reaction mass was left to stand until it separated into an upper oil-like layer and a lower water layer. The water layer was removed and the oil-like layer was dehydrated in an oven and thereafter cooled to room temperature and was liquid at 20° C. and 130° C. and is hereinafter known as material II–B.

EXAMPLE C

Procedure similar to that of Example B above was followed except that about 150 parts of the commercial formaldehyde solution (37%), 239 parts of beta pinene and 16 parts of concentrated sulphuric acid were used and the steam turned off at 180° F. The reaction was allowed to proceed at about 205° F. and after heat of reaction had commenced to subside, the temperature was maintained at from 195° F. to 200° F. for 9 hours, after which the reaction mass was neutralized with 2¼ parts of sodium hydroxide. The reaction product was separated from the bulk of the water, was dehydrated and consisted essentially of beta pinene-formaldehyde organic reaction product liquid at 20° C. and 130° C. and is hereinafter known as material II–C.

EXAMPLE D 576 parts of beta pinene, 1512 parts of formaldehyde (37% water solution) and 23 parts of muriatic acid were heated together in a reactor having an agitator, a reflux condenser and a heating and cooling jacket, the temperature being brought up to refluxing temperature (210° F.–220° F.) and agitation and refluxing being carried on for about 5 hours. The agitator was then stopped, heating was discontinued and cooling water was run through the jacket for about two hours during which time the pinene-formaldehyde organic reaction product settled. The reaction product, after being separated from the upper, water layer, was returned to the reactor and dehydrated under vacuum and at about 300° F. After this dehydration, the mass consisted essentially of beta pinene-formaldehyde reaction product showing a flow of 23–25 cm. Fluidometer test at 130° F. in 60 seconds, being liquid at 20° C. and 150° C. and is hereinafter known as product II–D.

EXAMPLE E

About 150 parts (1 mole proportion) of commercial terpineol of commerce or any one or a mixture of two or more of several terpineol isomers and 240 parts (3 mole proportion) of formaldehyde (37% concentration in water) and about 2.4 parts of concentrated sulphuric acid in 2.4 parts of water are mixed together and under a reflux condenser are then heated to boiling and maintained in the state of boiling under said condenser for a period of about 5 hours. Then the mass was permitted to cool to room temperature and neutralized with caustic. The bulk-water, carrying dissolved inorganic salt therein, was removed and the organic reaction mass was dehydrated under vacuum and at room temperature consisted essentially of terpineol-formaldehyde organic reaction product, liquid at 20° C. and 130° C. and is hereiafter known as material II–E.

EXAMPLE F 663 parts by weight of formaldehyde (about 37% solution in water), 222 parts of tertiary butyl alcohol and 3.5 parts of concentrated sulphuric acid were dissolved together and heated, at atmospheric pressure, to boiling under a reflux condenser at about 205° F. to 215° F. for about four hours at which time the reaction was substantially complete. The reaction mixture was neutralized with sodium hydroxide and the reaction products, which rose to the top, were separated from the bottom layer of salt solution, dehydrated with sodium carbonate and washed, and then dehydrated under vacuum. This product is identified herein as product II–F and is liquid at 20° C. and also 130° C.

Said materials II–A to II–F as well as all of the other organic reaction products of (a) and (b) as defined herein and as disclosed in the six U.S. patents hereinbefore referred to, are specific examples of materials (II) which contain one or more hydroxy groups and which may be reacted with alkylene oxide to provide illustrative examples of the novel products of this invention.

Materials (I) may be reacted with materials (II) either in the presence or absence of a catalyst for promoting reaction. The catalysts preferably employed are alkaline catalysts such as NaOH, KOH, Ca(OH)$_2$, sodium ethylate, sodium methylate, etc. The ratio by weight of material (II) reacted with material (I) may vary depending upon the amount of alkylene oxide to be reacted therewith, upon the molecular weight of the material (II) subjected to such reaction and also upon the number of hydroxy groups per molecule or other unit weight of material (II). In general, the ratio by weight of material (I) to material (II) is in the range of about 10 parts of material (I) to 1–100 parts of material (II).

The following Examples 1, 2 and 3 on are given by way of illustrating some of the novel products of this invention as well as some of the methods for preparing them, all parts being given by weight unless otherwise specified, such examples being given by way of illustration and not by limitation.

*Example 1*

100 grams of material II–D are heated at 160° C. to 250° C. under a reflux condenser while ethylene oxide is added thereto and in this case is being bubbled therethrough until the weight pick-up of the ethylene oxide is about 20 grams. The resulting novel reaction product is hereinafter known as product 1, is useful for the above stated purposes of the present invention as a wetting agent, detergent, emulsion breaker and other uses stated. The bubbling is continued and samples taken at various stages, as desired, to obtain other novel products differing from each other in the weight pick-up of ethylene oxide and having various degrees of wetting, detergent and emulsion breaking characteristics concomitant with the amount of ethylene oxide which has entered into the product of reaction. The weight pick-up of ethylene oxide may be carried on until the ratio of material II–D reacted with the ethylene oxide is about 10 to 100 to obtain novel reaction Product 1x. The ethylene oxide pick-up reaction can be carried on at about 180° C. and requires from about 1 hour to about 24 hours.

*Example 2*

1266 parts of product II–D and 25.3 parts of a 50% aqueous solution of sodium hydroxide were mixed together. The resultant mass was heated under subatmospheric pressure conditions of about 5 mm. of mercury pressure up to a temperature of 120° C. to remove the water therefrom. Then, under atmospheric pressure conditions the mass is heated to a temperature of 325° F. while ethylene oxide is being added thereto. This condition is maintained until 176 parts of ethylene oxide has combined therewith. 500 parts of the resultant mass (c) was neutralized and subjected to elevated temperature under subatmospheric pressure conditions to drive off water and other volatiles and the resultant reaction mass consists essentially of an ethylene oxide reaction product of product II–D, hereinafter known as product 2, having a viscosity of 16,600 cp. at 20° C. and finding substantially the same application as product 1.

720 parts of the said resultant mass (c), while under atmospheric pressure conditions was heated to 325° F. and ethylene oxide was added thereto until an additional 88 parts of said ethylene oxide is taken up by said mass. This mass is neutralized, dehydrated and the volatiles removed as before and the resultant mass consists essentially of an ethylene oxide-product II–D reaction product having a viscosity of 5,300 cp. at 20° C. and is hereinafter known as product 2a, is more water soluble or water dispersible than product 2 because of the larger proportion of ethylene oxide which has combined therewith.

*Example 3*

Employing the same procedure and the same quantities of reactants as those of Examples 1 and 2, except that for the material II–D therein there is substituted respective materials II–A; II–B; II–C; II–E and II–F; the individual terpene-formaldehyde oil-like layers (a) disclosed in Examples 1–5 of U.S. Patent 2,350,230, also fractions thereof liquid at 20° C. and at 130° C. and having boiling points above 160° C.; the individual pine oil-formaldehyde organic reaction products disclosed in Examples 1, 2 and 3 of U.S. Patent 2,323,129 and consisting essentially of terpene alcohol-formaldehyde organic reaction products; the individual terpene-formaldehyde and terpene alcohol-formaldehyde organic reaction products of Examples 1–5 of U.S. Patent 2,327,422; the individual tertiary amyl alcohol-formaldehyde organic reaction products of Examples 1–9 of U.S. Patent 2,333,927 and fractions thereof having boiling points of at least 135° C.; the individual tertiary butyl alcohol-formaldehyde organic reaction products of Examples 1–8 of U.S. Patent 2,333,928 and fractions thereof having boiling points of at least 135° C.; the individual tertiary hexyl alcohol-formaldehyde organic reaction products of Examples 1–3 of U.S. Patent 2,333,929 and fractions thereof having boiling points of at least 135° C., thereby to provide a large number of specific novel products of this invention differing from each other as derivatives of different materials (II) and the proportion of ethylene oxide combined therewith.

A large number of other specific novel products of this invention may be produced by following the teachings of Examples 1, 2 and 3 on as disclosed herein except that for the ethylene oxide, corresponding quantities of other alkylene oxides, such as propylene oxide and butylene oxide, etc., respectively, may be substituted therefor.

Also, if desired, said novel products of this invention may be produced under superatmospheric conditions in an autoclave. When catalyst is employed, only small quantities are used and in general measure from 0.5 to about 5% of the total weight of reactants depending upon the catalyst used and the rate of reaction desired.

The novel products of the present invention are ether derivatives of materials (II) in which the hydrogen atom of one or more hydroxy groups thereof have been substituted by $(R-O)_n-H$, wherein R is an alkylene group and n is at least 1 and is preferably 1–5 but may be even higher, up to 10 if desired by increasing the proportion of material (I) to material (II), illustrative examples of which are the novel products in the previous examples, find application in a number of different fields as hereinbefore set forth. In addition, they may be reacted with organic acids and with esters of organic acids to esterify the same. For example, acrylic acid may be reacted with said novel reaction products in the proportionate amount of one molecular weight of acrylic acid for each hydroxyl group in a predetermined unit amount of novel reaction product employed as a reactant thereby to produce the acrylate thereof. It is to be understood, of course, that the proportion of such acid to be employed may be varied depending upon the degree of esterification desired.

All of said novel products of this invention, some examples of which are all of those in the foregoing examples, may be combined with various epoxy resins in the proportions of 100 parts of the former to 10–1000 parts of the latter, all parts by weight and such combinations may be cured by employing an amine capable of curing the epoxy resins employed and/or a polybasic carboxylic acid or anhydride thereof of the same characteristics. Some of the specific curing agents which may be used are all of the compounds set forth in lines 20–42 of col. 2 of U.S. patent to D. Wasserman, 2,900,364 of August 18, 1959, and is hereby made part hereof. The presence of such novel product in such combinations in some cases, if they are of low viscosity, act to provide an epoxy-containing liquid of lower viscosity than the epoxy resin employed. In addition, the presence of such novel reaction products therein decreases the cost of the ultimate product produced without lowering the alkali, acid or solvent resistance thereof and moreover when such combinations are laid onto the surface of a material such as steel or aluminum and subsequently cured thereon, improved adhesion is effected.

The following are specific examples of some of the specific combinations of epoxy resins with specific novel products described herein.

100 parts of product I–E of U.S. patent to D. Wasserman 2,665,266 which is the glycidyl polyether of a reaction product of hydroxy benzene and cashew nut shell liquid and 100 parts of product 1 of Example 1 herein are mixed together and then there is added thereto 10 parts of diethylene triamine which is quickly stirred therein and the mass is poured directly into a container containing an electrical component to be encapsulated. Heat is applied whereupon said mass is converted to the substantially solid and infusible state to provide said electrical component with a substantially solid encapsulant. Instead of employing the diethylene triamine, 40 parts of phthalic anhydride may have been substituted therefor.

If desired, for the product 1–E of the Wasserman Patent 2,665,266, there may be substituted an equivalent amount of "Shell Epon 162" which is a normally liquid glycidyl polyether of glycerine, or other "Epon" resins such as glycidyl polyether of 5-pentadecyl resorcinol which has a melting point of 19–23° C., or various other epoxy resins such as the glycidyl polyether of 2,2-bis,para-hydroxy phenyl propane, known on the market as "Shell Epon 828," "Shell Epon 864," "Shell Epon 1001," etc. When the epoxy resin employed is normally solid, it is preferable, of course, that the combination of such epoxy resin and one of the novel products of this invention in combination therewith be first heated together and then the curing agent is added thereto.

Such novel products of this invention may be combined with various epoxy resins and then either with or without first having been thinned with an organic solvent, may have the polybasic curing agent, such as pyromellitic acid dianhydride, added thereto and such combination may be spread as a thin film on the material to be coated. Such coated material is then placed in an oven and allowed to remain therein for a period up to 24 hours at 350° F. thereupon the film is converted to the substantially solid and infusible state.

Another one of the uses of the novel products of this invention is to combine 100 parts thereof with 35 parts of maleic or phthalic anhydride, for example, and such combination is heated to approximately 80° C. and while at this temperature it may be spread as a coating on a material such as metal or the like to be protected and such coating material is then baked at approximately 350° F. for 24 hours whereupon the coating is converted to the substantially solid and infusible state.

When the epoxy resin employed and one of the novel products herein is combined therewith and both are liquid at room temperature, such combinations are usually "cold setting" when an amount of diethylene triamine or triethylene tetramine equal to about 10% by weight of the combination is uniformly distributed therethrough and consequently finds use as an adhesive, bonding agent and as a floor patching material.

The novel products of this invention also find application as coating materials in the absence of any epoxy or other resins. They may be combined with 10% by weight of diethylene triamine or triethylene tetramine or with 35% by weight of phthalic anhydride and such combinations may be reacted by the application of heat to provide intermediate products, or they may be employed as a coating material on glass cloth, sheet aluminum, sheet ferrous metals, etc., which are then baked in an oven for 24 hours at 350° F. to convert the coating to a continuous protective thin film.

Those novel products of this invention which are most water soluble, such as those having the largest proportion of alkylene oxide content, may be added to aqueous emulsions of polyvinyl alcohol and polyvinyl acetate respectively in amounts of 5 to 30 parts of the former to 100 parts of the latter. The components are mixed together for uniform distribution and then such combination may be applied as thin films onto paper or the like which is then baked in an oven at 250° F. for one to two hours thereby to provide a coating or sizing therefor.

This application is a continuation-in-part of our copending application Serial No. 566,084, filed February 17, 1956, now abandoned.

Having thus described the invention, we claim:

1. The method comprising heat reacting about 10 parts by weight of (I) alkylene oxide with from one to 100 parts by weight of (II) formaldehyde reaction product of a material selected from the group consisting of terpenes, terpene alcohols and tertiary alkyl alcohols, said (II) being liquid at 130° C.

2. The method comprising heat reacting about 10 parts by weight of (I) alkylene oxide with from one to 100 parts by weight of (II) a terpene-formaldehyde organic reaction product liquid at 130° C.

3. The method comprising heat reacting about 10 parts by weight of (I) alkylene oxide with from one to 100 parts by weight of (II) terpene alcohol-formaldehyde organic reaction product liquid at 130° C.

4. The method comprising heat reacting about 10 parts by weight of (I) alkylene oxide with from one to 100 parts by weight of (II) pine oil-formaldehyde organic reaction product liquid at 130° C.

5. The method comprising heat reacting about 10 parts by weight of (I) alkylene oxide with from one to 100 parts by weight of (II) beta pinene-formaldehyde organic reaction product liquid at 130° C.

6. The method comprising heat reacting about 10 parts by weight of (I) alkylene oxide with from one to 100 parts by weight of (II) a terpineol-formaldehyde organic reaction product liquid at 130° C.

7. The method comprising heat reacting about 10 parts by weight of (I) alkylene oxide with from one to 100 parts by weight of (II) a tertiary alkyl alcohol-formaldehyde organic reaction product liquid at 130° C.

8. The method defined in claim 1, with (I) being ethylene oxide.

9. The method defined in claim 5, with (I) being ethylene oxide.

10. The method defined in claim 6, with (I) being ethylene oxide.

11. The method defined in claim 7, with (I) being ethylene oxide.

12. An organic reaction product obtained by the method of claim 1.

13. An organic reaction product obtained by the method of claim 2.

14. An organic reaction product obtained by the method of claim 3.

15. An organic reaction product obtained by the method of claim 4.

16. An organic reaction product obtained by the method of claim 5.

17. An organic reaction product obtained by the method of claim 6.

18. An organic reaction product obtained by the method of claim 7.

19. A novel composition of matter comprising (1) a polyglycidyl polyether of a compound selected from the group consisting of polyhydric phenols and polyhydric aliphatic alcohols and (2) a reaction product produced by the method of claim 1, said (1) having an average 1,2 epoxy equivalency greater than 1.

20. A composition defined in claim 19, cured to the substantially solid and infusible state in the presence of a curing agent therefor.

References Cited in the file of this patent

UNITED STATES PATENTS

| 2,350,230 | Harvey | May 30, 1944 |
| 2,825,712 | Witzel | Mar. 4, 1958 |
| 2,890,192 | Spencer | June 9, 1959 |

FOREIGN PATENTS

| 850,233 | Germany | Sept. 22, 1952 |

UNITED STATES PATENT OFFICE
CERTIFICATE OF CORRECTION

Patent No. 3,119,781              January 28, 1964

Mortimer T. Harvey et al.

It is hereby certified that error appears in the above numbered patent requiring correction and that the said Letters Patent should read as corrected below.

Column 1, line 69, for "solubility of" read -- solubility by --; column 2, line 40, for "November 9, 1948" read -- November 9, 1943 --.

Signed and sealed this 30th day of June 1964.

(SEAL)
Attest:

ERNEST W. SWIDER
Attesting Officer

EDWARD J. BRENNER
Commissioner of Patents